May 23, 1967

A. PERANIO 3,320,792

AIR FILTER TESTER

Filed Sept. 16, 1964

INVENTOR.
Anthony Peranio
BY Paul H. Heller

INVENTOR.
Anthony Peranio
BY Paul H. Heller

United States Patent Office 3,320,792
Patented May 23, 1967

3,320,792
AIR FILTER TESTER
Anthony Peranio, Brooklyn, N.Y., assignor to Mobil Oil Corporation, a corporation of New York
Filed Sept. 16, 1964, Ser. No. 396,976
7 Claims. (Cl. 73—38)

This invention relates to an improved filter tester and to a method for determining whether the porosity of the filter is within an acceptable range.

It has heretofore been conventional in service stations to determine the condition of filters, such as an air filter, by visual inspection. In such a procedure the amount of light transmitted through the filter is used to evaluate filter blockage or reduction in porosity. However, due to the variability of filter design and construction and the inevitable subjectivity of human operators, this technique does not provide for an accurate test.

An alternative procedure which has been suggested is to measure the pressure drop across the filter element with the engine operating under a given set of load conditions. For example, if the vacuum measured inside the filter under a rated load is found to be, for example, above 15 inches of water, the filter would be considered blocked and thus unsatisfactory. Several disadvantages to this method appear, among which may be mentioned the difficulty of obtaining repeatable conditions in the test environment on an actual engine and the difficulty in obtaining results which are generally applicable to various engines and filters.

One method which has been developed enables the operator to remove the filter from its engine environment and place it under test conditions on a chamber which is then evacuated. By this method a fixed vacuum is applied to any of the wide range of filters and the amount of air circulating through such a chamber is monitored. A plate with two possible openings is placed on top of the filter. This top is used to sealingly engage the filter over an opening in the evacuated chamber. However, this method and apparatus has not been entirely satisfactory for the wide range of filters commonly in use. In addition, calibration of this device is difficult and continued comparisons between new and used filters are necessary to prove the validity of each individual filter test.

Thus the prior art does not provide an apparatus for a quick and simple procedure whereby an accurate indication of filter condition, related to engine performance, can be obtained. Such a device is particularly desired for use in the recently developed automotive diagnostic centers which require an objective and rapid test for the many variables which are necessary to maximum automotive efficiency.

It is, therefore, an object of this invention to provide an improved method and apparatus whereby the condition of the filter may be accurately and rapidly determined.

It is a particular object of this invention to provide an improved evacuation chamber and method for using the same whereby the condition of an automotive air filter may be readily determined.

Other objectives and advantages of this invention will become apparent from a consideration of the following detailed description. The invention in a specific embodiment is illustrated in the accompanying drawings wherein like characters of reference indicate like parts in the drawings.

Figure 1:
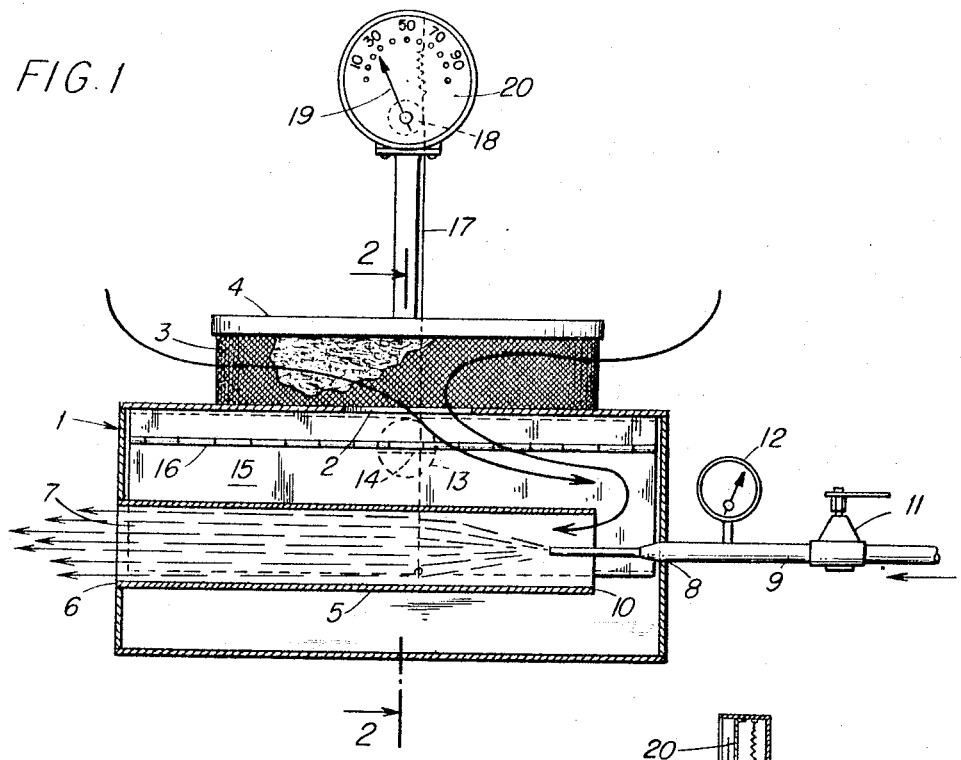
FIGURE 1 is a frontal sectional view of the device of this invention.

Basically, the apparatus of this invention comprises: a chamber; a first opening therein, over which the filter to be tested is placed; means to reduce and monitor the pressure in said chamber relative to ambient pressure; a second opening in said chamber with an adjustable cover to restrict its area; and means to monitor the magnitude of the air flow through said second opening. The pressure in the chamber is reduced by an amount determined by the size of the filter; ambient air is thus brought into the chamber through the filter and through the second opening. The amount of air entering through the second opening is proportional to the restriction imposed by the filter across the first opening and thus is indicative of the porosity of said filter.

In the drawings a chamber, 1, is depicted with a first opening 2, for conventional air filters a five-inch diameter opening has been found to be suitable. The filter, 3, to be tested is placed over said first opening and an imperforate cover plate, 4, is placed over the filter. Inside the chamber a tube, 5, is positioned with a first end, 6, adjacent to a second opening, 7, in the chamber wall. In this particular embodiment, end 6 is sealingly engaged to the chamber in the opening, 7. A third opening, 8, appears in the opposite wall of the chamber. Through this opening an air or gas supply conduit, 9, enters the chamber and is positioned within tube 5 at its second end, 10. A pressure regulator means, 11, is positioned on conduit 9 and further down stream a monitoring means, gage 12, is placed. The monitoring means, 12, measures a variable, air pressure in conduit 9, which is a function of the pressure in chamber 1. The air supplied through conduit 9 enters the chamber through opening 8 and is discharged into tube 5, from which the air exits at opening 7. The flow of air through tube 5 creates a reduced pressure within chamber 1. Ambient air is thus drawn through filter 3 in a manner and direction similar to the flow of air through a filter as positioned in actual operation on an automobile.

Figure 2:
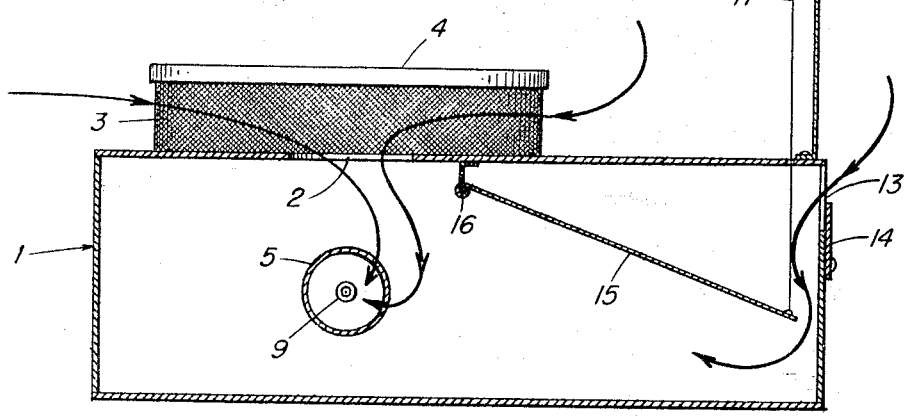
FIGURE 2 is a sectional view of the device of FIGURE 1 through line 2—2.

As depicted in FIGURE 2, a fourth opening, 13, in the chamber wall is also an inlet for ambient pressure. The flow of air through this opening, 13, is small compared to the flow through the filter opening, 2, in view of the relatively smaller area available at opening 13. An adjustable cover, 14, is positioned over opening 13 to provide a means for calibrating the filter tester. A particular monitoring device which has been found to be suitable consists of a baffle, 15, within the flow path of air entering from opening 13. The baffle, 15, is attached at one end to the chamber wall by a hinge, 16. A wire, 17, is attached to the other end of the baffle and extends to a conventional spring loaded indicator mechanism, 18, which actuates pointer 19 in front of a scale, 20. As is readily apparent from FIGURE 2, the flow of air through opening 13 against baffle 15 will transmit a force through wire 17 to actuate indicator mechanism 18. Thus the flow of air through opening 13 will be indicated by the position of pointer 19 on scale 20. By adjusting the area of inlet 13, it is possible to bring the results of different instruments into line with one another for calibration purposes.

In a specific embodiment of this invention a standard set-point was obtained by placing a calibration orifice plate with a three-inch diameter hole in its center over opening 2, which was five inches in diameter. With the orifice calibration plate in position on top of the device, pressure regulator 11 and gage 12 are employed to provide 10 p.s.i. at the inlet of chamber 1. This provided a balance point reading of 30 on scale 20. If a reading of 30 is not obtained, the rear calibration port area, 13, is adjusted using the movable damper 14, until the proper balance point reading is obtained. The important reason for using a three-inch orifice plate and an adjustable calibration damper is to be able to adjust each instrument to form an agreed upon standard of performance. Thus it is possible to test the filter on different instruments and obtain reproducible results. Various filters were positioned over the first opening, 2, and the imperforate cover plate 4 was positioned on top of the filter. Air was supplied to the apparatus from an 80–100 p.s.i. source. The air passed through the adjustable pressure regulator and then to the high velocity jet forming tube of the aspirator. Pressure at the inlet was measured by a 0–30 p.s.i. gage. The presence of a high velocity jet in the aspirator tube induced a low pressure region in the chamber of the tester. Accordingly, the existence of this vacuum caused atmospheric air to flow through the air filter in a direction similar to that in an automobile engine. The air flowed from the outside to the inside of the filter and through the five-inch diameter opening into the chamber where it was inducted into the aspirator tube. There it was mixed with the jet formed by the primary air supply and exited from the chamber. The volume of air through the air filter was a function of (among other things) the inlet pressure. Also, for a given filter and a certain pressure, the vacuum obtained in the chamber was a function of the amount of blockage of the filter element by dirt and other particulate matter. This vacuum was measured by the indicator device when the moving force of air through the relatively small port opening into the chamber from the rear of the instrument contacted the hinged baffle plate which actuated the spring loaded pointer. The atmospheric air was directed on and around the baffle and through the clearance space between the baffle edges and the walls of the chamber. The baffle actuating air flow was small compared with the flow through the filter since the opening for the filter was 20 square inches compared to the area for the baffle flow which was 3 square inches. However, when a sufficiently blocked filter was placed over the larger opening with the cover applied, more air, of course, tended to flow around the baffle. This increased the pressure difference across the baffle with a consequent increase in force to actuate the indicator mechanism. Thus for a given inlet pressure and filter, the reading of the indicator was a function of filter blockage.

A number of new commercial filters were tested by placing them on the tester and adjusting the inlet pressure until a balance point reading of 30 was obtained on the scale. These pressure readings were then plotted as a function of the filter characteristic number. The filter characteristic number is defined as the product of filter diameter and height. Essentially, it is a number proportional to the area the filter presented to air flowing through it. Results of these tests are given in FIGURE 3 wherein there was a sufficient directional tendency displayed to warrant drawing the straight line shown. Additionally, a chart was prepared which provided the information from each particular run, the type of filter and the pressure setting indicative of an unblocked condition. On the basis of this chart and FIGURE 3, it is possible to test the performance of any air filter according to its diameter and height. The filter type is found on the chart, the associated pressure reading is noted, the filter is placed on the tester and the inlet pressure is adjusted to correspond with the pressure noted on the chart. A reading of 30 will then indicate an unblocked filter and correspondingly higher readings will be relative to the reduced porosity of the filter due to a blocked condition. If the filter to be tested is not found on the chart, its diameter and height should be measured and by use of FIGURE 3, a closely estimated inlet pressure for an unblocked filter can be determined.

In view of the limited number of popularly used filters, further useful charts may be compiled listing filters and pressure settings according to automobile manufacturers, their car models and year.

To answer the question concerning what filter condition will call for its replacement, a test was performed on an automobile engine in which two engine parameters were investigated as functions of percent blockage of the engine air filter. Results of the test are given in FIGURE 4.

A vehicle with a 6-cylinder, 225 cubic inch engine, operating at a fixed speed of 4000 r.p.m. at full throttle was tested on a test stand with a dynamometer under conditions requiring close to maximum air flow into its engine. For various conditions of filter blockage, engine horsepower was measured. In addition, the pressure at the outlet of the filter was also measured.

Figure 4:
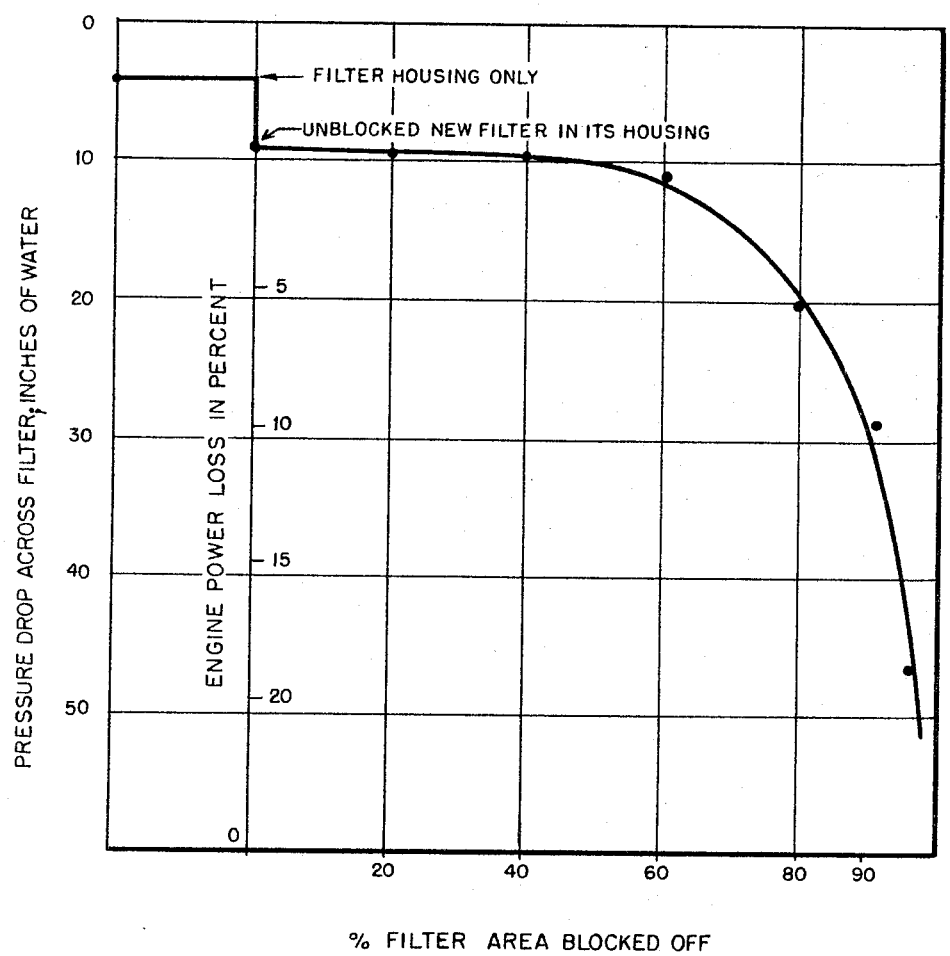
FIGURE 4 is a graph representing the performance of an engine as a function of filter porosity (percent of filter area blocked off).

Examination of FIGURE 4 shows that as the filter inlet area is blocked off from 0 to 60% there is very little change in engine performance. In fact, over this very wide range, the engine loses no more than about 1% of its power possibilities, even for this engine which demanded large quantities of air. This can be understood by noting that the inlet area presented by the typical air filter is many times greater than the area either of the carburetor inlet, or, in some models, of the relatively small conduit passing air into the air filter housing. Consequently, it is not until the effective air filter inlet air is reduced to an area approaching that of either the conduit or the carburetor inlet, that loss in power effects are noted.

However, once past 60% blockage of air filter inlet area, it is found that a serious loss in power can be expected, particularly when the engine is pressed for peak performance. A filter blocked 90% for example, would deprive this engine of 10% of its peak potential when driving at high turnpike speeds, or when attempting to pass, or in any situation demanding peak engine performance.

Figure 5:
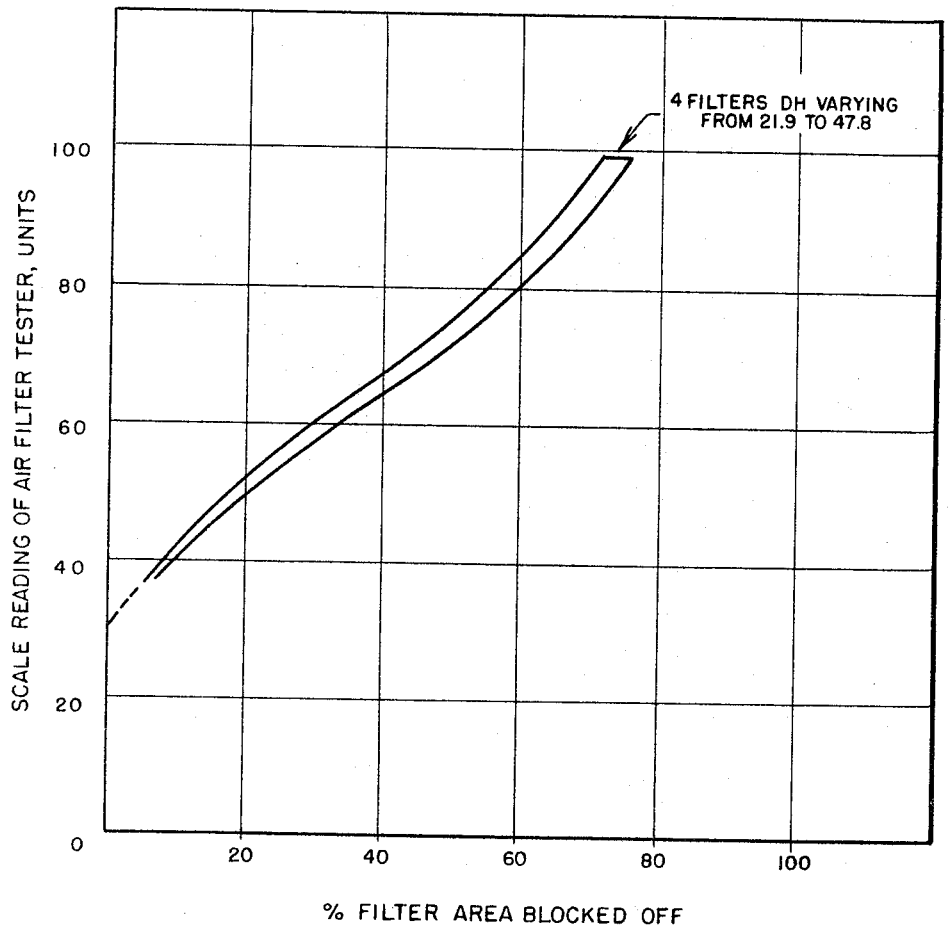
FIGURE 5 represents the results of tests on a specific embodiment of this invention wherein the scale readings on an air filter tester are plotted against filter porosity (percent of filter area blocked off).

In the particular embodiment described above several unused filters of medium to large size, were tested with varying percentages of their area blocked off to prevent the flow of air. The results are illustrated in FIGURE 5 which shows the scale reading of the air filter tester as a function of percent filter area blocked off. Since, as shown in FIGURE 4, a loss of engine power occurs when 60% of the filter area is blocked off, the filter should be replaced before this point is reached. If a value of 55% blockage is used as the standard to call for replacement of the filter, a scale reading of about 75 or more will indicate an unsuitable filter condition.

Figure 3:
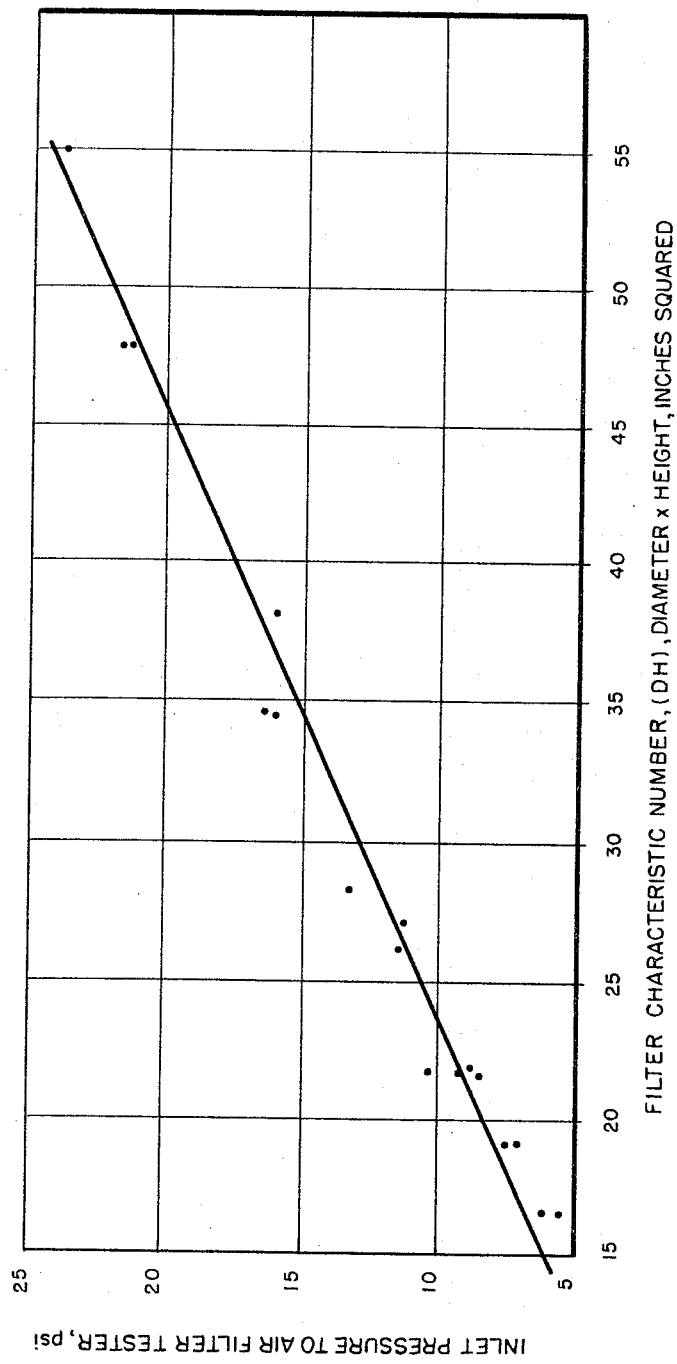
FIGURE 3 represents the results of tests on a specific embodiment of this invention wherein filter characteristic numbers are plotted against inlet test pressures.

In order to put the test results into conveniently usable form for application in diagnostic centers, tables of "Calibration Data for Automobile Engine Air Filter Testing" have been compiled which represent the information gathered for FIGURE 3 in greater detail. To test a filter, the operator must know the automobile's manufacturer, its year, and model. He finds the appropriate line in the table for the vehicle being tested, and in the column for "pressure setting p.s.i." he finds the value of inlet pressure he should use to test this filter. The air filter is placed centrally over the five-inch opening, and the cover plate put on it. Air pressure is applied, and the regulator is adjusted until the pressure gage reads the value indicated in the table. An alternative means for reducing the pressure in the chamber, such as a vacuum pump, could be used. From the scale reading of the air filter tester the operator can determine whether or not the filter should be replaced. It is recommended in accordance with the data in FIGURES 4 and 5 that any filter giving a scale reading of over 75 should re replaced.

Thus this invention provides a novel apparatus and procedure which is quite simple and give a measurable result on a meter which is related to engine performance.

The invention has been described in terms of specific embodiments set forth in detail, but it should be understood that these are by way of illustration only and that the invention is not necessarily limited thereto. Alternative constructions will become apparent to those skilled in the art in view of this disclosure, and accordingly, modifications of the apparatus and process disclosed herein are to be contemplated within the spirit of this invention.

I claim:
1. A filter tester comprising:
 (a) a chamber,
 (b) a first opening in said chamber adapted to receive the filter thereover,
 (c) means to reduce the pressure in said chamber relative to ambient pressure,
 (d) means to monitor a variable which is a function of the pressure in said chamber,
 (e) a second opening in said chamber,
 (f) cover means to adjustably restrict the area of said second opening, and
 (g) means to monitor the magnitude of the air flow through said second opening,
wherein air is drawn into said chamber through said first and second openings, the flow of said air entering through said second opening being in proportion to the restrictions placed across said first opening due to the limited porosity of a filter placed thereover.

2. The filter tester of claim 1 wherein an imperforate plate member is adapted to sealingly engage the upper planar surface of an air filter positioned over said first opening.

3. A filter tester comprising:
 (a) a chamber,
 (b) a first opening in said chamber adapted to receive a filter thereover,
 (c) a second opening in said chamber,
 (d) a tube supported within said chamber, a first end of said tube positioned adjacent to said second opening,
 (e) a third opening in said chamber,
 (f) conduit means to admit gas into said chamber through said third opening and into the second end of said tube,
 (g) means to supply and monitor variable predetermined amounts of gas to said conduit means,
 (h) a fourth opening in said chamber,
 (i) cover means to adjustably restrict the area of said fourth opening, and
 (j) means to monitor the magnitude of the air flow through said fourth opening,
wherein the passage of the gas through said conduit means and thence through said tube reduces the pressure in said chamber relative to ambient pressure, thus drawing air into said chamber through said first and fourth openings, the flow of said air entering through said fourth opening being in proportion to the restrictions placed across said first opening due to the limited porosity of a filter placed thereover.

4. The filter tester of claim 3 wherein an imperforate plate member is adapted to sealingly engage the upper planar surface of an air filter positioned over said first opening.

5. In the method for determining the porosity of a filter in a tester comprising:
 (a) a chamber,
 (b) a first opening in said chamber adapted to receive a filter thereover,
 (c) a second opening in said chamber,
 (d) a tube supported within said chamber, a first end of said tube positioned adjacent to said second opening,
 (e) a third opening in said chamber,
 (f) conduit means to admit gas into said chamber through said third opening and into the second end of said tube,
 (g) means to supply and monitor variable predetermined amounts of gas to said conduit means,
 (h) a fourth opening in said chamber, and
 (i) means to monitor the magnitude of the air flow through said fourth opening,
the improvement which comprises:
 (1) placing a filter across said first opening,
 (2) directing an amount of gas through said conduit means and said tube to obtain a flow of gas in said conduit means determined by the size of said filter, and
 (3) monitoring the flow of air through said fourth opening.

6. The method of claim 5 which comprises adjusting the size of said fourth opening to initially calibrate the flow of air therethrough.

7. The method of claim 5 which comprises covering the exposed planar surface of said filter by an imperforate plate.

References Cited by the Examiner
UNITED STATES PATENTS

| | | | |
|---|---|---|---|
| 2,072,369 | 3/1937 | Jenson | 73—388 |
| 3,066,527 | 12/1962 | Stein | 73—38 |

LOUIS R. PRINCE, *Primary Examiner.*

W. A. HENRY, *Assistant Examiner.*